United States Patent
Lee et al.

(10) Patent No.: US 7,105,094 B1
(45) Date of Patent: Sep. 12, 2006

(54) METHOD FOR THE REMOVAL OF HEAVY METALS FROM ACIDIC WASTEWATER AND CHEMICAL SOLUTIONS

(75) Inventors: T. Richard Lee, Hacienda Heights, CA (US); Ye Yi, Salt Lake City, UT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/250,706

(22) Filed: Oct. 6, 2005

(51) Int. Cl.
  *C02F 1/24* (2006.01)
  *C02F 9/04* (2006.01)
  *C02F 9/08* (2006.01)
  *C02F 101/20* (2006.01)
  *C02F 103/24* (2006.01)

(52) U.S. Cl. .............. 210/703; 210/705; 210/725; 210/727; 210/804; 210/221.2; 210/205; 210/206; 210/912

(58) Field of Classification Search ............. 210/703, 210/705, 725, 727, 804, 205, 206, 221.2, 210/912
See application file for complete search history.

(56) References Cited

U.S. PATENT DOCUMENTS

| | | | | |
|---|---|---|---|---|
| 3,664,951 A | * | 5/1972 | Armstrong | 210/707 |
| 4,743,379 A | * | 5/1988 | Sugihara et al. | 210/705 |
| 5,240,600 A | * | 8/1993 | Wang et al. | 210/188 |
| 5,900,154 A | * | 5/1999 | Henriksen | 210/703 |
| 6,106,711 A | * | 8/2000 | Morse et al. | 210/221.2 |
| 6,635,182 B1 | * | 10/2003 | Coleman, Jr. | 210/705 |
| 6,896,815 B1 | * | 5/2005 | Cort | 210/695 |

FOREIGN PATENT DOCUMENTS

JP  56-130293  * 10/1981

* cited by examiner

*Primary Examiner*—Thomas M. Lithgow
(74) *Attorney, Agent, or Firm*—David S. Kalmbaugh

(57) ABSTRACT

A method which uses a process reactor having three separate reaction stages to remove high concentrations of heavy metals from acidic wastewater and chemical solutions. During each of three stages the pH level of the wastewater is increased and sludge and flocculate organic and metal hydrocyl matters are removed from the wastewater to provide clean water which is discharged in to a sewer system.

20 Claims, 6 Drawing Sheets

METHOD FOR THE REMOVAL OF HEAVY METALS FROM ACIDIC WASTEWATER AND CHEMICAL SOLUTIONS

BACKGROUND OF THE INVENTION

1. Field of the Invention

The present invention relates generally to the removal of environmentally unsafe materials from wastewater and chemical solutions. More particularly, the present invention relates to a method which uses a process reactor having three separate reaction stages to remove high concentrations of heavy metals from acidic wastewater and chemical solutions.

2. Description of the Prior Art

A variety of industrial activities generate wastewater that is highly polluted by heavy metals such as copper (Cu), nickel (Ni), zinc (Zn) and lead (Pb), Chemical Oxygen Demand (COD), Total Suspended Solids (TSS), and other organic matters. For general industrial activities the concentrations of heavy metals in wastewater streams range from low to moderate in the hundreds parts per million (ppm). For some industrial operations such, as pipe descaling, flushing and cleaning of heat exchange systems by using very acidic chemical solutions at a pH value below 1, the concentration of heavy metals in wastewater streams is very high in the range of thousands mg/l (or parts per million (ppm)). Wastewater streams containing heavy metals is considered environmentally hazardous and needs to be processed prior to being discharged into municipal wastewater systems to meet local regulatory discharge requirements. Increasingly stringent regulations on effluent discharge mandate efficient heavy metal removal techniques.

For the wastewater streams with low to moderate concentrations of heavy metals in the hundreds ppm, a variety of conventional and commercially available techniques have been employed to remove heavy metals either as primary, secondary or tertiary unit operations and processes to achieve the desired level of treatment. The techniques for removal of heavy metals from wastewater streams include air flotation, precipitation by neutralization, flocculation and coagulation, adsorption and ion exchange.

However, conventional clean up technologies used in heavy metal removal are either inadequate in meeting the disposal limits or too expensive in terms of chemical, operation and maintenance (O&M) costs for an acidic waste stream with high concentrations of heavy metals in the level of thousands ppm. For an example, the cost associated with removing heavy metals from acidic wastewater generated by industrial power plant heat exchangers and shipboard seawater cooled heat exchanger pipe flushing cleaning operations is very expensive since the wastewater normally contains over 2,000 ppm, 800 ppm, 100 ppm and 10 ppm of Cu, Ni, Zn, and Pb, respectively.

The following conventional and commercially available methods used in removing heavy metals from various wastewaters have their limitations and are inadequate or too expensive to treat very acidic wastewater of pH less than one and very concentrated heavy metal wastewater at the level of thousands ppm.

The hydroxide precipitation/clarification process adjusts the pH of the wastewater with an alkaline reagent to reduce the solubility of the dissolved metals. Settling occurs and the resultant metal hydroxide precipitates are removed. Sodium hydroxide (NaOH) is most commonly used for hydroxide precipitation. Sulfide precipitation, which precipitates metals as sulfides instead of hydroxides, achieves low levels of metal solubility in highly chelated wastewater streams. Since each metal hydroxide has a characteristic solubility that is dependent on pH, the optimal pH for precipitating all regulated metals to the discharge level from a wastewater stream is very difficult to obtain.

Dissolved air flotation (DAF) technology employs the combination of air flotation and flocculation to separate the metals from the wastewater stream. During metal precipitation, ferrous sulfate, sodium hydrosulfite, aluminum sulfate, soda ash or sodium dithiocarbamate (DTC) is added to provide co-precipitation for the removal of metals from chelated wastewaters. While DAF technology is an effective metals removal method, this process has a metal removal rate of 70% (100 ppm to 30 ppm), generates a significantly larger volume of sludge compared with hydroxide treatment, needs a large foot print, and is operation and maintenance (O&M) intensive.

The electro-coagulation (EC) process passes a controlled electrical current through industrial wastewater at a monitored pH level to aid in the removal of contaminants including heavy metals in very low concentration levels. It is impractical to use this technology to treat wastewater having very high metal concentration levels of thousands ppm at a low pH of less than one.

The ion-exchange process is widely used in the field of wastewater treatment to remove dissolved metal ions in very low concentration levels. Wastewater is passed through an ion-exchange which consists of a porous bed of organic resin with an ion exchange function. Cationic and anionic ion exchangers react with cations and anions, respectively, for removal or recovery of heavy metals. These can be placed either in series or in mixed beds. The pH is critically controlled to ensure that the pH is within the operating range of the resin. Most O&M problems for ion exchange applications relate to resin fouling and the frequency of regenerating the resin beds. This technology is not practical for direct treating a wastewater stream with low pH (less than 1), very high metal concentration of over thousand ppm, and a high COD of 10,000.

SUMMARY OF THE INVENTION

The present invention overcomes some of the difficulties of the past including those mentioned above in that the present invention comprises a vary effective process reactor having three separate reaction stages to remove high concentrations of heavy metals from acidic wastewater and chemical solutions.

The pH is adjusted to a range of 2 to 4 and preferably a pH of 3 in a first stage conditioning tank with the addition of a cationic polymer when the wastewater is passing through a first serpentine pipe structure. The flocs of organic matters and heavy metal hydroxyl compounds are then skimmed off from the wastewater by using an air-sparged hydrocyclone (ASH) flotation device and skimmer assembly.

The pH of the wastewater is then increased to a range of 5.5 to 6.5 and preferably a pH of 6 in a second stage conditioning at which time a significant formation of metal hydroxyl compounds occurs. The same cationic polymer is added into the wastewater in a second serpentine pipe structure to form flocs that primarily consist of heavy metal hydroxyl compounds. The flocs formed in the stage are tight and heavy with a small portion of liquid volume, and are readily separable from the water by use of second stage settler.

After the removal of the flocs by the second stage settler, the pH of the wastewater is further increased to a level of 7.5 to 9.0 and preferably a pH of 8.5 in a third stage conditioning tank at which time all residual heavy metals in the wastewater are precipitated. The same type of the cationic polymer is then added into the wastewater in a third stage serpentine pipe structure followed by the addition of an anionic polymer to perform co-flocculation of the wastewater. The flocs formed in the third stage are also tight, heavy, containing a small portion of the liquid volume, and are readily separable from the water by a third stage settler.

Clean water is discharged from the third stage settler into a local sewer system.

DETAILED DESCRIPTION OF A PREFERRED EMBODIMENT

Figure 1:
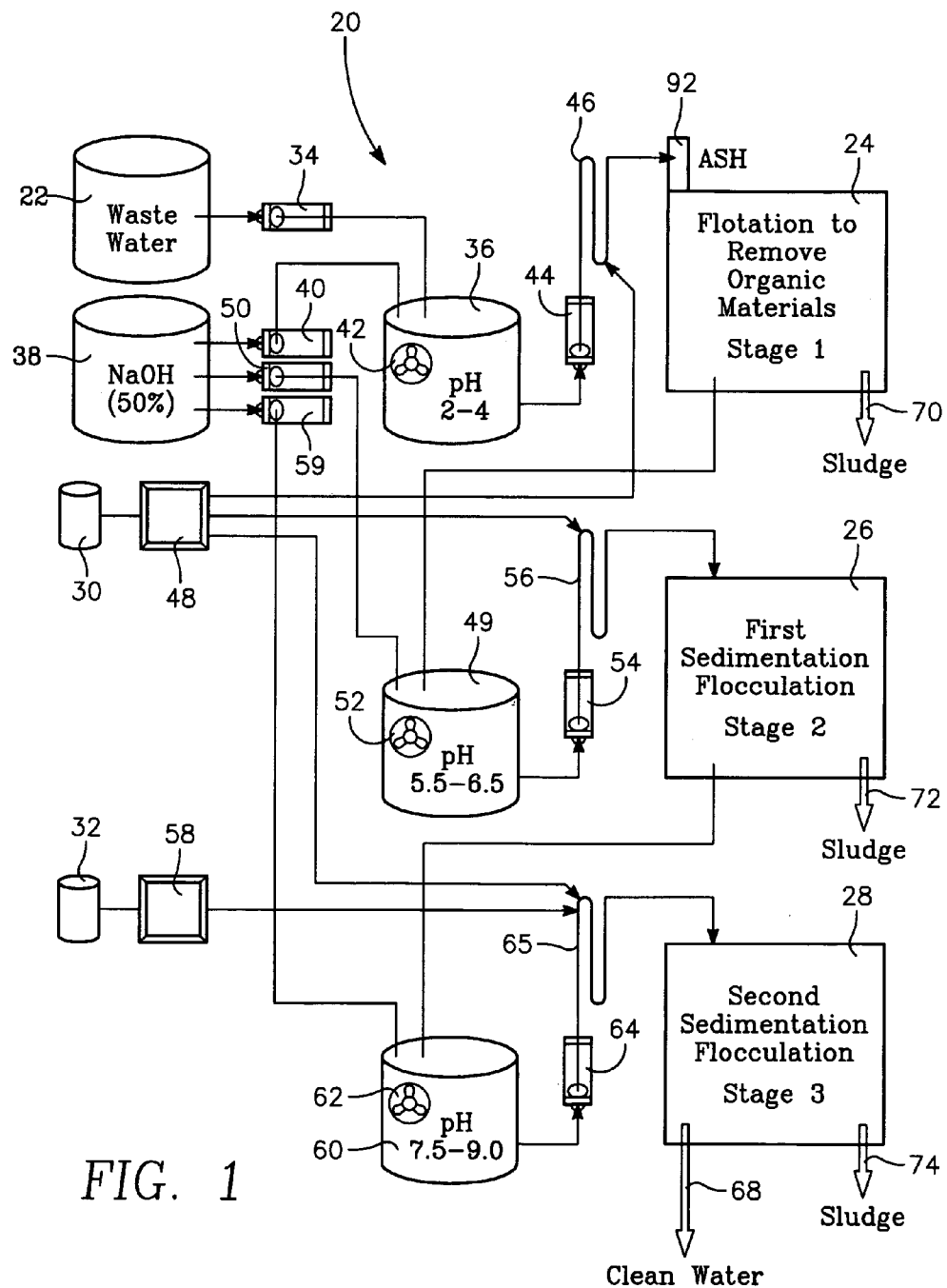
FIG. 1 is a schematic diagram of the process reactor for removing high concentration heavy metals from wastewater and chemical solutions which comprises the present invention.

Referring to FIG. 1, there is shown a schematic diagram of an process reactor 20 which removes high concentration heavy metals from wastewater or chemical solutions. Pollutants which may removed from wastewater utilizing process reactor 20 include copper (Cu), nickel (Ni), zinc (Zn) and lead (Pb), Chemical Oxygen Demand (COD), Total Suspended Solids (TSS), and other organic matters.

Process reactor 20 has three separated reaction stages: (1) a flotation stage to remove organic materials from wastewater 22; (2) a first flocculation/sedimentation stage; and (3) a second flocculation/sedimentation stage. The flotation stage utilizes air flotation to treat wastewater 22. The first and second flocculation/sedimentation stages treat acidic wastewater or waste chemical solution generated from power plant and shipboard heat exchanger pipe descaling and flushing process. The wastewater stream 22 normally contains Cu (approximately 2,000 ppm), Ni (approximately 800 ppm), Zn (approximately 100 ppm), Pb (approximately 10 ppm), and about 10,000 ppm of Chemical Oxygen Demand (COD) material. At such concentrations, it is extremely difficult to practically and economically utilize any conventional technologies to process the wastewater and to achieve the heavy metal removal efficiencies to the single digit concentration levels that may feasible for direct discharge to a sewer system.

Process reactor 20 has several advantages over conventional and commercially available technologies that have had difficulty in treating very acidic (pH less than one) wastewater with over thousands of parts per million (ppm) of heavy metals and organic matters adequately and cost-effectively. Process Reactor 20 is a continuous process that removes organic material and heavy metals to concentration levels of single digit ppms which are below federal and state sewer discharge limits. In addition to optimal metal removal efficiency (from thousand ppms to 1 ppm or below), Process Reactor 20 uses very little chemicals, i.e. less than one gallon of cationic and antionic polymers 30 and 32, respectively, in treating 5,000 gallons of wastewater. Process Reactor 20 generates very little sludge, uses few mechanical moving parts with minimal energy consumption, and is compact and mobile.

In the process of the present invention, a liquid transfer pump 34 transfers or pumps wastewater 22 to a conditioning tank 36. Conditioning tank 36, which includes a mixer 42, receives a 50% solution of sodium hydroxide (NaOH) from a chemical storage tank 38 via a liquid transfer pump 40. Conditioning tank 36 includes a mixer 42 which increases the pH level of the wastewater 22 to a range of approximately 2–4 at which minimal formation of metal hydroxyl compounds and precipitates is achieved.

Wastewater 22 is pumped from conditioning tank 36 into a serpentine pipe 46 by a liquid transfer pump 44. A cationic polymer 30 is added to the wastewater 22 in serpentine pipe 46 via a polymer transfer pump 48. This results in flocculate organic matters (flocs) forming within serpentine pipe 46. The flocs which mainly consist of organic matters are then removed by flotation separation using an air-sparged hydrocyclone (ASH) flotation device 92 in a settler/flotation tank 24 (first stage of the treatment process).

After flotation separation process 24 is completed, wastewater 22 is transferred to a conditioning tank 49 which has a mixer 52. The pH of the wastewater is increased to a level of between 5.5 and 6.5 by adding sodium hydroxide that is transferred from chemical storage tank 38 to conditioning tank 49 by a liquid transfer pump 50.

The wastewater 22 is transferred to a serpentine pipe 56 by a liquid transfer pump 54. Polymer transfer pump 48 also supplies the cationic polymer 30 to serpentine pipe 56 in which the wastewater and cationic polymer are mixed to form flocs that primarily consist of heavy metal hydroxyl compounds which are readily separable from the water by a settler 26 during the second stage of the treatment process.

After the removal of the flocs by the settler 26, the wastewater 22 is transferred to a conditioning tank 60 which has a mixer 62. Sodium hydroxide from chemical storage tank 38 is pumped by a transfer pump 59 to conditioning tank 60 and mixed with wastewater 22 increasing its pH level to a range of 7.5 to 9.0 prior to being pumped to serpentine pipe 65 by a liquid transfer pump 64. Cationic polymer 30 is then added into the wastewater in serpentine pipe 65 by a polymer transfer pump 48 followed by the addition of an anionic polymer 32 which is pumped into serpentine pipe 65 by a polymer transfer pump 58. Serpentine tank 65 mixes the cationic polymer 30 and the anionic polymer 32 with wastewater 22 to form flocs prior to transferring the wastewater to the settler 28. The flocs formed in the third stage are also tight, heavy, containing a small portion of the liquid volume, and are readily separable from the water by a settler 28. Clean water then exits settler 28 in the manner indicated by arrow 68, while sludge exits settlers 24, 26 and 28 in the manner indicated by arrows 70, 72 and 74, respectively.

Figure 2A:
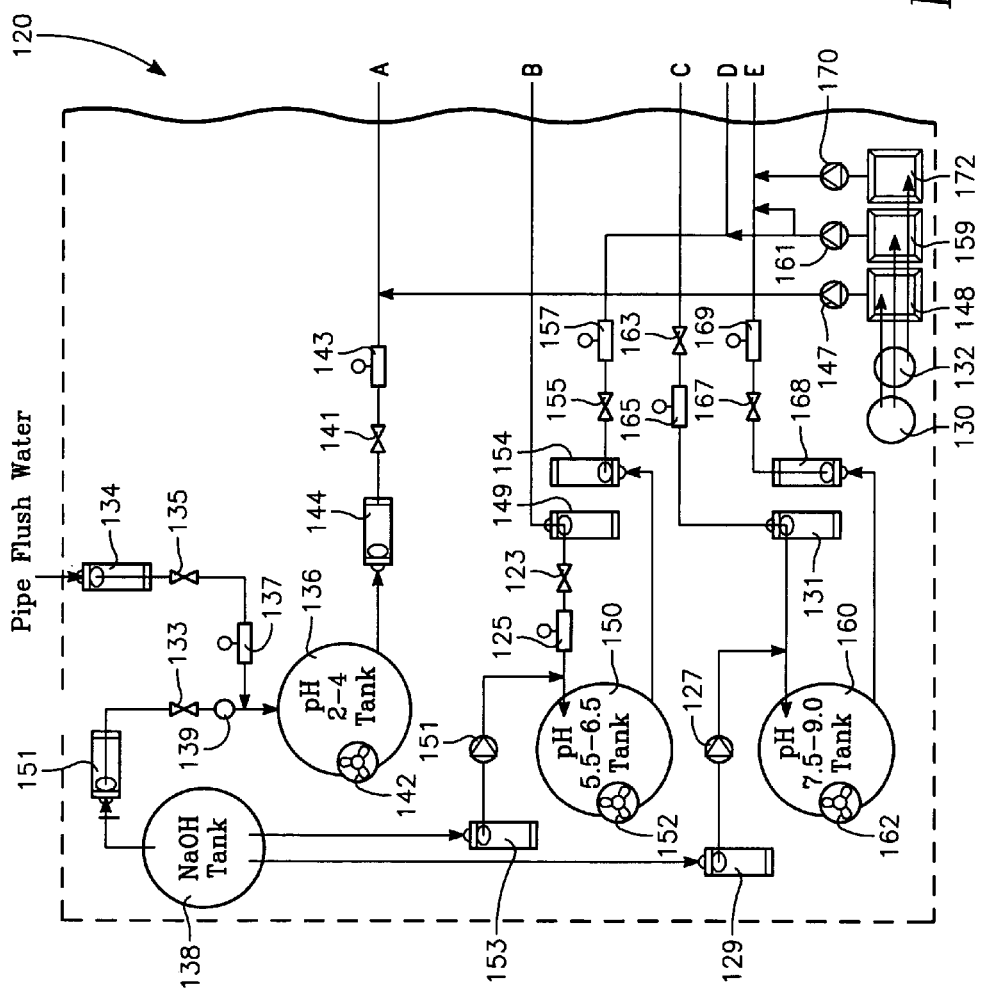
FIGS. 2A and 2B are a detailed schematic diagram of an embodiment of the process reactor of FIG. 1 which uses a trailer to tow the process reactor between locations processing the wastewater of chemical solutions.
Figure 2B:
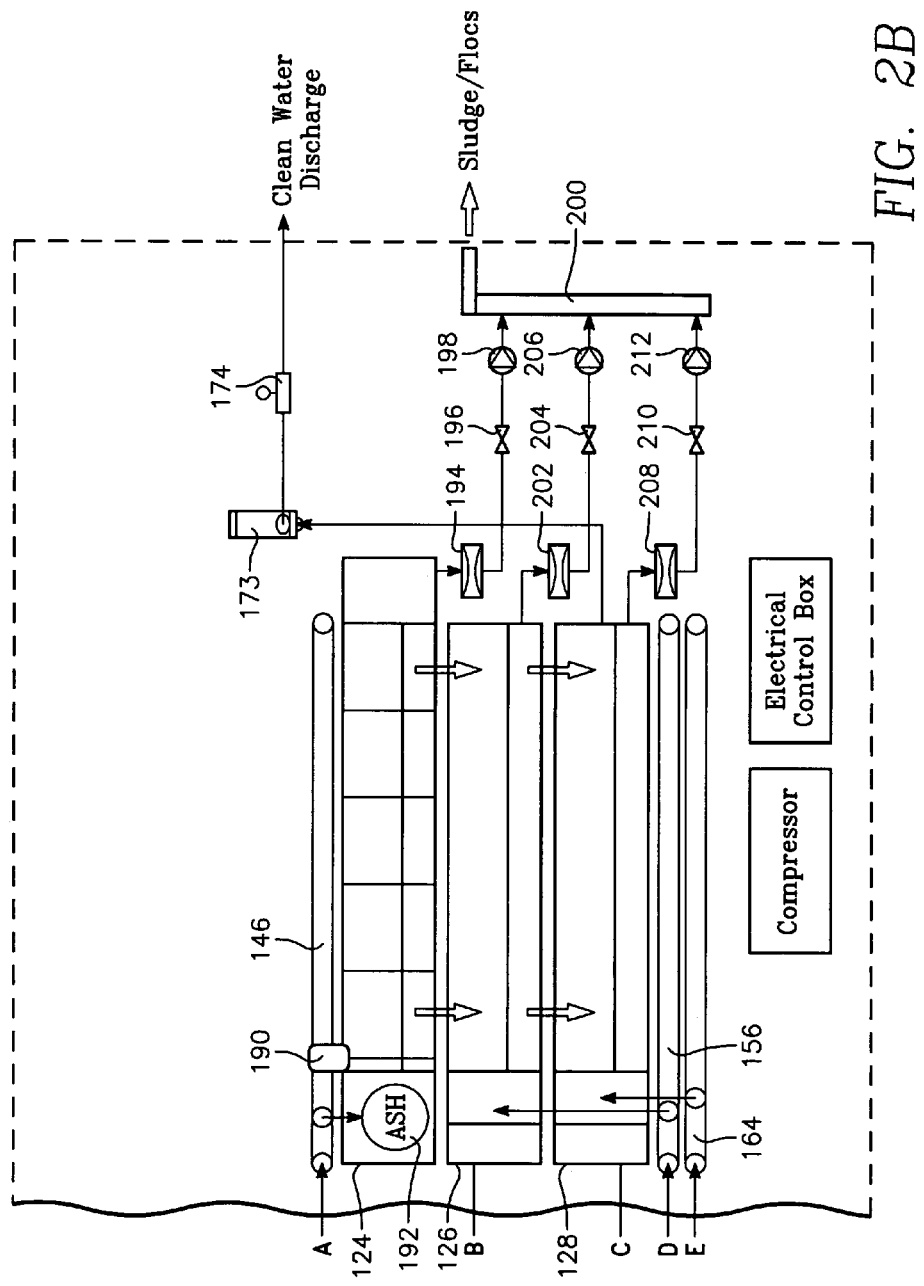
Figure 3:
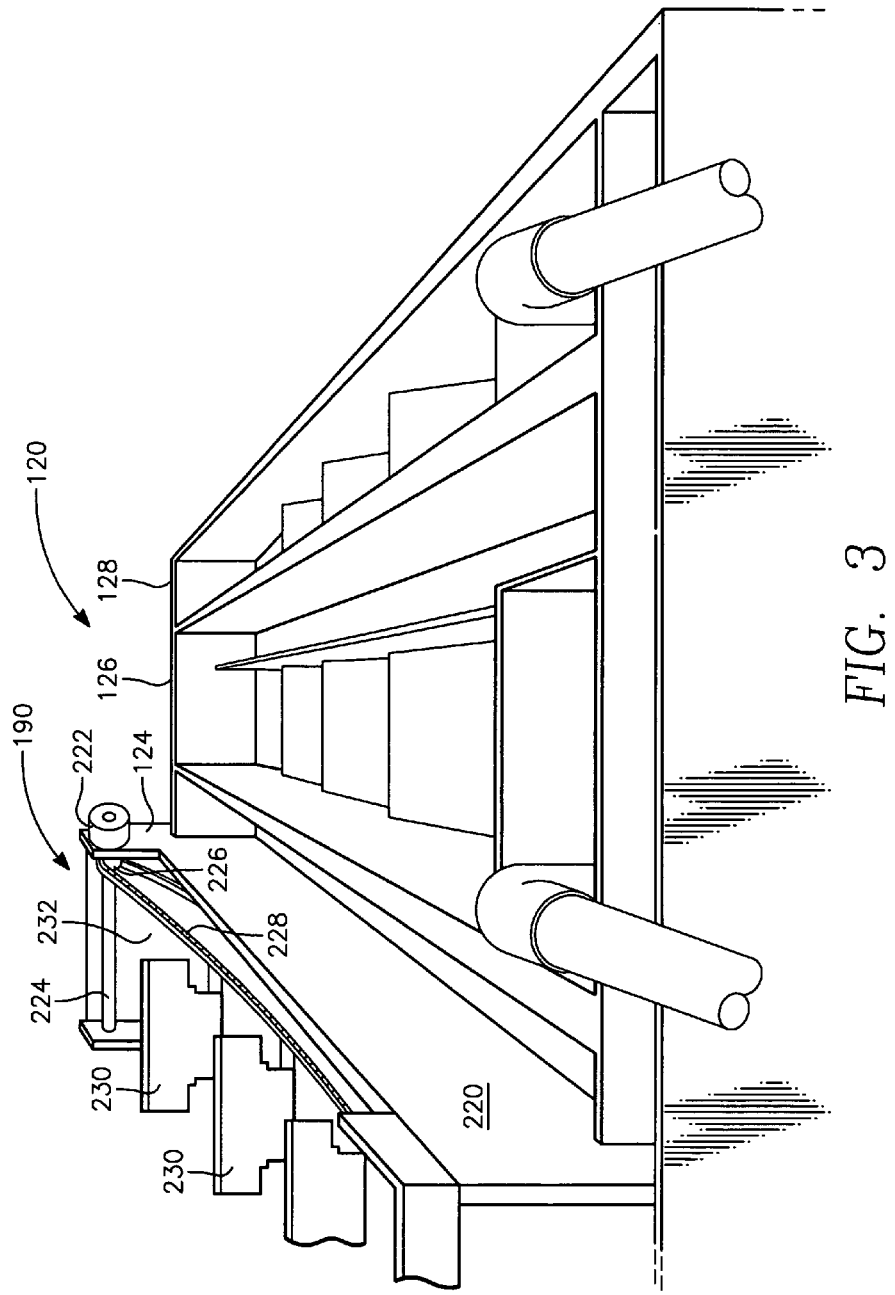
FIG. 3 is a perspective view illustrating the stage one, stage two and stage three settlers of FIG. 2B used to remove heavy metals from wasterwater.

Referring to FIGS. 1, 2A and 2B, there is shown an embodiment 120 of the present invention which is adapted for use on a trailer or other mobile platform. Wastewater (or the waste acidic chemical solutions from pipe descaling and flushing) is first pumped through a flow valve 135 into pH conditioning tank 136 by pump 134 where the pH of the waste is increased to a range of about 2–4 and preferably a pH of 3 at which formation of organic compounds and flotation occurs. Conditioning tank 136, which has a mixer 142, receives a 50% solution of sodium hydroxide (NaOH) from tank 138 which is pumped through a flow valve 133 and a check valve 139 by a pump 140. A flow meter 137 monitors the rate of wastewater flow into tank 136.

After pH adjustment within conditioning tank 136, the wastewater is pumped through a flow valve 141 and flow meter 143 by a pump 144 into a serpentine pipe structure 146 where a cationic polymer 130 is added to flocculate organic matters inside the serpentine pipe structure 146. The flocs formed at this stage mainly consist of organic matters. The cationic polymer 130 is added to the wastewater in serpentine pipe structure 146 by a polymer transfer pump 148 which pumps the cationic polymer 130 through a check valve 147 into serpentine pipe structure 146. Flow meter 143 measures the rate of fluid flow into serpentine pipe structure 146.

After flocculation, the wastewater flows into a flotation tank/settler 124 for flotation separation of flocs from water using a skimmer system 190 which functions as a sludge remover assembly. In this embodiment of the present invention, an air-sparged hydrocyclone (ASH) flotation device 192 is used to provide air bubbles which are introduced into the wastewater stream to separate and assist in the removal of fine particles of heavy metals/pollutants resulting in the formation of sludge within settler 124. It should be noted that any other flotation device other than ASH will serve the purpose.

Upon completion of the flotation step (stage one), the wastewater is discharged by a pump 149 through a flow valve 123 and flow meter 125 into the second pH conditioning tank 150 where the pH of the wastewater is further increased to range of about 5.5–6.5 and preferably a pH of 6.0. Sodium hydroxide is transferred from chemical storage tank 138 through a check valve 151 to conditioning tank 150 by a liquid transfer pump 153 and mixed with the wastewater in conditioning tank 150 utilizing mixer 152. At this pH level, a significant formation of copper hydroxyl compounds as well as a small portion of nickel hydroxyl compounds occur. Flow meter 125 monitors the rate of wastewater flow into tank 150.

Upon completion of the stage two pH adjustment, the wastewater is pumped through a flow valve 155 and a flow meter 157 into a serpentine pipe structure 156 where the same cationic polymer is added to mix with the wastewater for the purpose of flocculating these metal hydroxyl compounds. The cationic polymer 130 is added to the wastewater in serpentine pipe structure 156 by a polymer transfer pump 159 which pumps the cationic polymer 130 through a check valve 161 into serpentine pipe structure 156. Flow meter 157 measures the rate of fluid flow into serpentine pipe structure 156.

After mixing, the wastewater is discharged into a settler 126 which performs sedimentation flocculation. The flocs formed in this step (stage two) are tight, and heavy, containing a small portion of the liquid volume, and are readily separable from the wastewater by settling toward the bottom of the settler 126.

Upon completion of the stage two sedimentation flocculation process, the wastewater is discharged through a check valve 163 and flow meter 165 into the third pH conditioning tank 160 by a liquid transfer pump 131. Sodium hydroxide is transferred from chemical storage tank 138 through a check valve 127 to conditioning tank 150 by a liquid transfer pump 129 and mixed with the wastewater in conditioning tank 160 utilizing mixer 162. In pH conditioning tank 160, the pH of the wastewater is further increased to a range of about 7.5–9.0 and preferably a pH of 8.5. At the pH value of 8.5, all residual Cu and Ni metal ions are precipitated.

Upon completion of the stage three pH adjustment, the wastewater is pumped by a liquid transfer pump 168 through a flow valve 167 and a flow meter 169 into a serpentine pipe structure 164 where the same cationic polymer and another anionic polymer are added to mix with the wastewater for the purpose of flocculating Zn and Pb metal precipitates. The cationic polymer 130 is pumped through check valve 161 into serpentine pipe structure 164 by pump 159, and the anionic polymer 132 is pumped through check valve 170 into serpentine pipe structure 164 by pump 172. Flow meter 169 measures the fluid flow rate of wastewater into serpentine pipe structure 164.

The wastewater is then discharged into a settler 128 (stage three) to perform the sedimentation flocculation. The flocs formed in stage three are also tight, and heavy, containing a small portion of the liquid volume, and are readily separable from the water by settling toward the bottom of the settler 128. After the stage three sedimentation flocculation process, the wastewater is generally free of heavy metals and is readily to be discharged into a local sewer system. A liquid transfer pump 173 discharges clean water into the local sewer system and a flow meter 174 monitors the flow rate of clean water into the system.

A diaphragm pump 194 pumps sludge from settler 124 through a flow valve 196 and a check valve 198 into a sludge discharge pipe 200. A diaphragm pump 202 pumps flocs from settler 126 through a flow valve 204 and a check valve 206 into a sludge/floc discharge pipe 200. A diaphragm pump 208 pumps flocs from settler 128 through a flow valve 210 and a check valve 212 into a sludge/floc discharge pipe 200.

The effectiveness of process reactor 20 to remove high concentration heavy metals from wastewater or chemical solutions has been successfully proven in laboratory bench tests. In tests of process reactor 20, three different acidic waste chemical solutions generated from shipboard heat exchanger pipe descaling and flushing operation were collected and treated. The following samples provides characteristics of wastewater before (influent) and after (effluent) the treatment. As can be seen from the samples, the treatment process successfully reduced the concentration levels of four heavy metals to the levels of a single digit that can be safely discharged into a municipal wastewater system.

|  | Influent | Effluent |
| --- | --- | --- |
|  | Sample #1 Concentration (mg/l) | |
| Copper | 1800 | 0.5 |
| Nickel | 670 | 2.1 |
| Zinc | 79 | BQL |
| Lead | 7.4 | BQL (Below Quantative Level) |
|  | Sample #2 Concentration (mg/l) | |
| Copper | 1890 | 0.2 |
| Nickel | 730 | 0.3 |
| Zinc | 83 | 0.1 |
| Lead | 10 | BQL |
|  | Sample #3 Concentration (mg/l) | |
| Copper | 1900 | 4.1 |
| Nickel | 680 | 1.8 |
| Zinc | 92 | 0.1 |
| Lead | 8.6 | BQL |

As stated previously, although the method involves three stages of the processing, the overall consumption of polymer for treating 5,000 gallons of wastewater is less than one gallon, a level that is very economical. The overall equipment size is far smaller than the single stage of dissolved air flotation (DAF) or settler separation process, i.e. each of the settlers 124, 126 and 128 are metallic rectangular shaped cells having overall dimensions of 1 ft. 6 ft. The removal efficiency of heavy metals from the wastewater is also superior to the single stage DAF flotation or settler separation process. More importantly, the method and apparatus of the present invention provides a process to treat acidic wastewaters with heavy metal concentrations which is not economically feasible using existing technologies.

Referring to FIGS. 2A, 2B, 3 and 4, FIG. 3 illustrates the first stage settler 124, second stage settler 126 and third stage settler 128 for process reactor 120. Positioned at the upper end of first stage settler 124 is skimmer system 190 which removes heavy sludge from first stage settler 124. Mounted on a side wall 220 of settler 124 near one end of settler 124 is a motor 222 which has a shaft and sprocket assembly 224. Shaft and sprocket assembly 224 includes a pair of sprockets 226. Each sprocket 226 of assembly 224 engages a chain 228 which moves in a counter-clockwise direction when motor 222 is activated. Attached to the chains 228 are a plurality of rectangular shaped sludge removal plates 230. The sludge removal plates 230 are used to remove heavy sludge from the upper end of settler 124 transferring the sludge which plates 230 remove to a sludge receiving tank 232 located at the other end of settler 124. The sludge is then pumped from tank 232 by pump 194 (FIG. 2B) into sludge discharge pipe 200.

Figure 4:
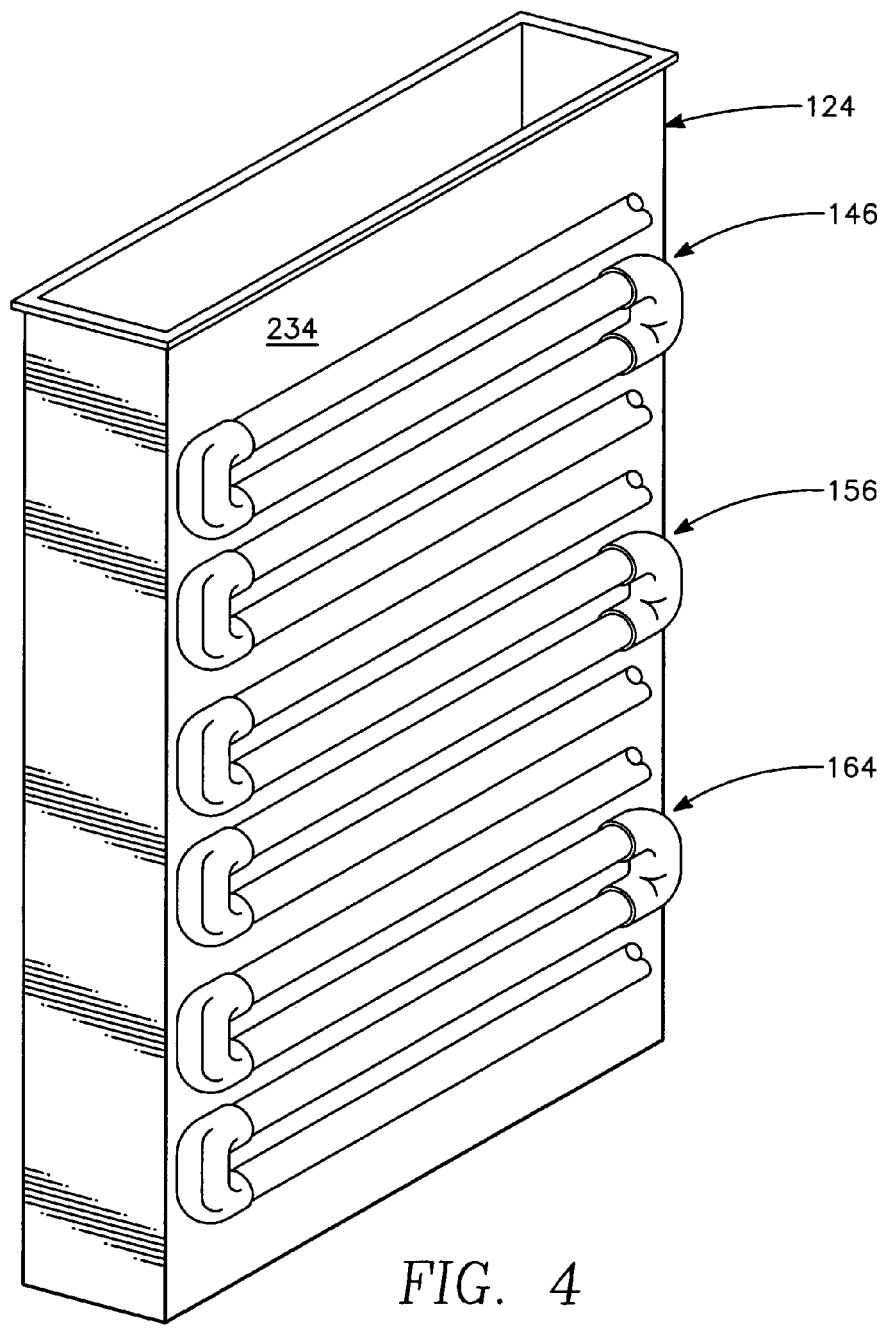
FIG. 4 is a perspective view illustrating the serpentine pipe structures of FIG. 2B used to provide sufficient resident time for hydroxyl compound formation.

FIG. 4 illustrates the serpentine pipe structures 146, 156 and 164 for reactor 120 which are located adjacent side wall 234 of settler 124

Figure 5:
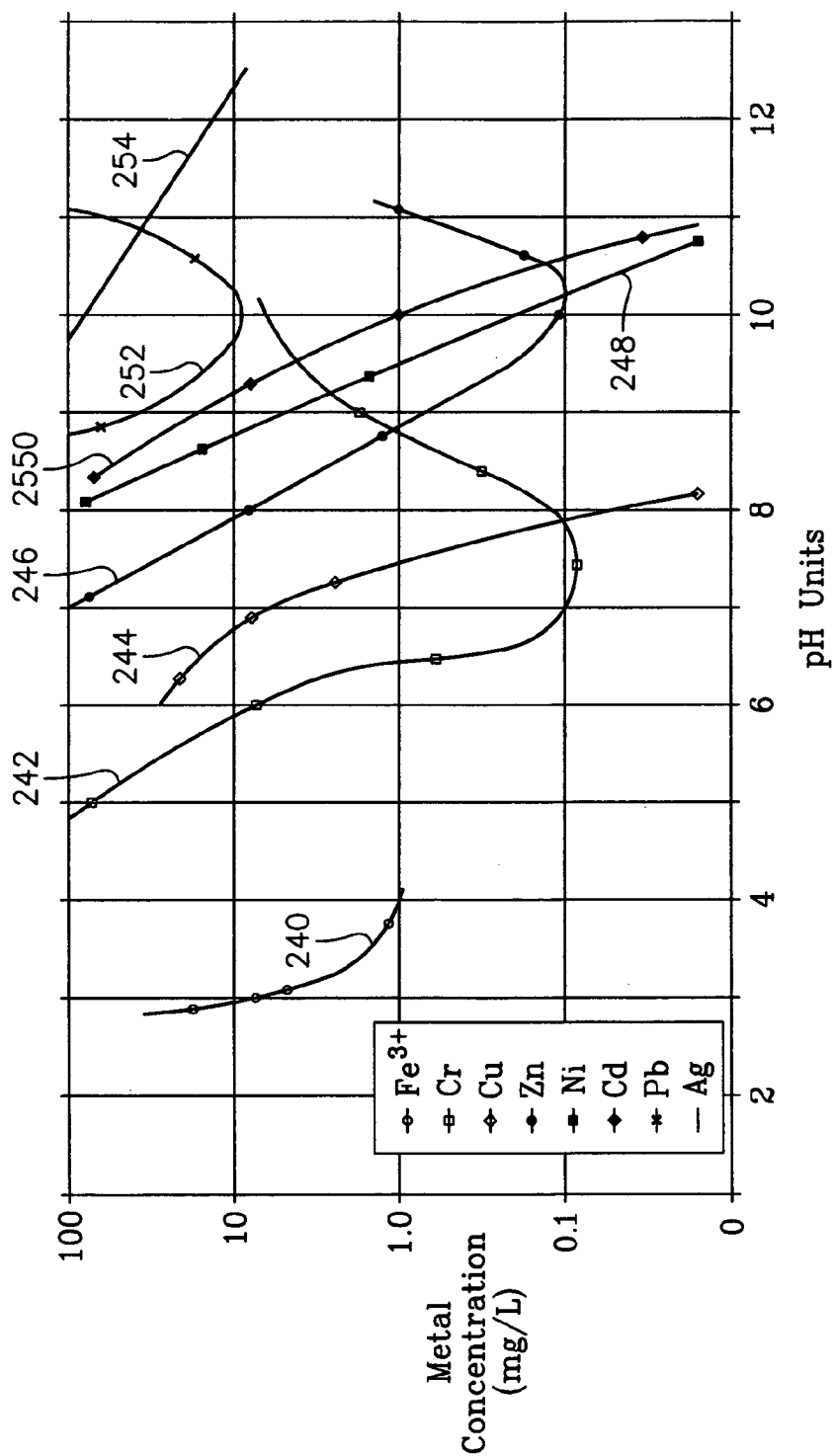
FIG. 5 illustrates metal solubility curves for a variety of metals at a variety of pH levels.

Referring to FIG. 5, there are shown metal solubility curves for a variety of metals at a variety of pH levels. Plot 240 illustrates the metal solubility curve for iron; plot 242 illustrates the metal solubility curve for chromium; plot 244 illustrates the metal solubility curve for copper; plot 246 illustrates the metal solubility curve for zinc; plot 248 illustrates the metal solubility curve for Nickel; plot 250 illustrates the metal solubility curve for cadmium; plot 252 illustrates the metal solubility curve for lead; and plot 254 illustrates the metal solubility curve for silver.

From the foregoing, it may readily be seen that the present invention comprises a new, unique and exceedingly useful reactor apparatus for removing high concentrations of heavy metals from wastewater which constitutes a considerable improvement over the known prior art. Many modifications and variations of the present invention are possible with respect to the above technique. It is to be understood that within the scope of the appended claims the invention may be practiced otherwise than as specifically described.

What is claimed is:

1. A method for removing high concentrations of heavy metals from acidic wastewater comprising the steps of:
   (a) supplying said acidic wastewater to a first conditioning tank to treat said acidic wastewater;
   (b) supplying a fifty percent solution of sodium hydroxide to said first conditioning tank;
   (c) mixing said sodium hydroxide with said acidic wastewater to increase a pH level of said acidic wastewater to a range of approximately 2–4 resulting in a minimal formation of metal hydroxyl compounds within said acidic wastewater;
   (d) adding a cationic polymer to said acidic wastewater resulting in a formation of flocculate organic matters within said acidic wastewater;
   (e) transferring said acidic wastewater to a flotation tank;
   (f) providing air bubbles into said acidic wastewater within said floatation tank which separate said metal hydroxyl compounds and said formation of flocculate organic matters from said acidic wastewater forming sludge within an upper portion of said flotation tank;
   (g) removing said sludge from said flotation tank;
   (h) transferring said acidic wastewater having said sludge removed therefrom to a second conditioning tank;
   (i) supplying said fifty percent solution of sodium hydroxide to said second conditioning tank;
   (j) mixing said sodium hydroxide with said acidic wastewater to increase a pH level of said acidic wastewater to a range of approximately 5.5–6.5 resulting in a significant formation of copper hydroxyl compound flocs and a minimal formation of nickel and zinc hydroxyl compound flocs within said acidic wastewater;
   (k) adding said cationic polymer to said acidic wastewater resulting in a first formation of flocculate hydroxyl matters within said acidic wastewater;
   (l) transferring said acidic wastewater to a first settler wherein said first settler separates and removes said first formation of flocculate hydroxyl matters, said significant formation of copper hydroxyl compound flocs and said minimal formation of nickel and zinc hydroxyl compound flocs from said acidic wastewater;
   (m) transferring said acidic wastewater having said said first formation of flocculate hydroxyl matters, said significant formation of copper hydroxyl compound flocs and said minimal formation of nickel and zinc hydroxyl compound flocs removed therefrom to a third conditioning tank;
   (n) supplying said fifty percent solution of sodium hydroxide to said third conditioning tank;
   (o) mixing said sodium hydroxide with said acidic wastewater to increase said pH level of said acidic wastewater to a range of approximately 7.5–9 resulting in a significant formation of residual heavy metal flocs within said acidic wastewater;
   (p) adding said cationic polymer to said acidic wastewater and an anionic polymer to said acidic wastewater resulting in a second formation of flocculate hydroxyl matters within said acidic wastewater;
   (q) transferring said acidic wastewater to a second settler wherein said second settler separates and removes said second formation of flocculate hydroxyl matters and said significant formation of residual heavy metal flocs from said acidic wastewater resulting in substantially clean water exiting said second settler.

2. The method of claim 1 wherein each of said first, second and third conditioning tanks has a mixer to mix said acidic wastewater with said sodium hydroxide to raise the pH level of said acidic wastewater exiting from said first conditioning tank, said second conditioning tank and said third conditioning tank, wherein an optimal pH level of said acidic wastewater in said first conditioning tank is 3, the optimal pH level of said acidic wastewater in said second conditioning tank is 6 and the optimal pH level of said acidic wastewater in said second conditioning tank is 8.5.

3. The method of claim 1 wherein the heavy metals removed by said method from said acidic wastewater include copper, nickel, zinc and lead.

4. The method of claim 1 further comprising the steps of:
(a) providing a first serpentine pipe structure which adds said cationic polymer to said acidic wastewater from said first conditioning tank and mixes said cationic polymer with said acidic watsewater resulting in said formation of flocculate organic matters within said acidic wastewater;
(b) providing a second serpentine pipe structure which adds said cationic polymer to said acidic wastewater from said second conditioning tank and mixes said cationic polymer with said acidic watsewater resulting in said first formation of flocculate hydroxyl matters within said acidic wastewater; and
(c) providing a third serpentine pipe structure which adds said cationic polymer and an anionic polymer to said acidic wastewater from said third conditioning tank and mixes said cationic polymer and said anionic polymer with said acidic watsewater resulting in said second formation of flocculate hydroxyl matters within said acidic wastewater.

5. The method of claim 4 further comprising the steps of:
(a) providing a first liquid transfer pump connected to said first conditioning tank and said first serpentine pipe structure for transferring said acidic wastewater from said first conditioning tank through said first serpentine pipe structure to said flotation tank;
(b) providing a second liquid transfer pump connected to said second conditioning tank and said second serpentine pipe structure for transferring said acidic wastewater from said second conditioning tank through said second serpentine pipe structure to said first settler; and
(c) providing a third liquid transfer pump connected to said third conditioning tank and said second settler for transferring said acidic wastewater from said third conditioning tank through said third serpentine pipe structure to said second settler.

6. The method of claim 4 further comprising the steps of:
(a) providing a first polymer transfer pump connected to said first serpentine pipe structure, said second serpentine pipe structure and said third serpentine pipe structure for transferring said cationic polymer from a source for said cationic polymer to said first serpentine pipe, said second serpentine pipe structure and said third serpentine pipe structure; and
(b) providing a second polymer transfer pump connected to said third serpentine pipe structure to transfer said antionic polymer from a source for said antionic polymer to said third serpentine pipe structure.

7. The method of claim 1 further comprising the steps of:
(a) providing a first chemical transfer pump connected to said first conditioning tank for transferring said sodium hydroxide from a chemical storage tank to said first conditioning tank;
(b) providing a second chemical transfer pump connected to said second conditioning tank for transferring said sodium hydroxide from said chemical storage tank to said second conditioning tank; and
(c) providing a third chemical transfer pump connected to said third conditioning tank for transferring said sodium hydroxide from said chemical storage tank to said third conditioning tank.

8. The method of claim 1 wherein said method reduces a concentration of copper from about 1800 mg/l to about 0.5 mg/l; a concentration of nickel from about 670 mg/l to about 2.1 mg/l; a concentration of zinc from about to about 79 mg/l to zero mg/l; and a concentration of lead from about 7.4 mg/l to about zero mg/l.

9. The method of claim 1 further comprising the step of providing a wastewater liquid transfer pump connected to said first conditioning tank to supply said acidic wastewater to said first conditioning tank.

10. A method for removing high concentrations of heavy metals from acidic wastewater comprising the steps of:
(a) providing a chemical storage tank containing a 50% solution of sodium hydroxide (NaOH);
(b) transferring said sodium hydroxide to a first conditioning tank connected to said chemical storage tank to receive said sodium hydroxide;
(c) supplying said acidic wastewater to said first conditioning tank;
(d) mixing said sodium hydroxide with said acidic wastewater in said first conditioning tank to increase a pH level of said acidic wastewater to a range of approximately 2–4 resulting in a minimal formation of metal hydroxyl compounds within said acidic wastewater;
(e) transferring said acidic wastewater from said first conditioning tank to a first serpentine pipe structure;
(f) adding a cationic polymer to said acidic wastewater when said acidic wastewater is in said first serpentine pipe structure resulting in a formation of flocculate organic matters within said acidic wastewater;
(g) transferring said acidic wastewater from said first serpentine pipe structure to a floatation tank which has an air-sparged hydrocyclone (ASH) flotation device and a skimmer;
(h) providing air bubbles into said acidic wastewater separating said metal hydroxyl compounds and said formation of flocculate organic matters from said acidic wastewater forming sludge within an upper portion of said flotation tank, wherein said air-sparged hydrocyclone (ASH) flotation device generates said air bubbles and provides said air bubbles to said acidic wastewater;
(i) removing said sludge from said flotation tank, wherein said skimmer removes said sludge from said flotation tank;
(j) transferring said acidic wastewater from said flotation tank to a second conditioning tank which is connected to said chemical storage tank to receive said sodium hydroxide;
(k) mixing said sodium hydroxide with said acidic wastewater in said second conditioning tank to increase said pH level of said acidic wastewater to a range of approximately 5.5–6.5 resulting in a significant formation of copper hydroxyl compound flocs and a minimal formation of nickel and zinc hydroxyl compound flocs within said acidic wastewater;
(l) transferring said acidic wastewater from said second conditioning tank to a second serpentine pipe structure;
(m) adding said cationic polymer to said acidic wastewater when said acidic wastewater is in said second serpentine pipe structure resulting in a first formation of flocculate hydroxyl matters within said acidic wastewater;
(n) transferring said acidic wastewater from said second serpentine pipe structure to a first settler;
(o) separating and removing said first formation of flocculate hydroxyl matters, said significant formation of copper hydroxyl compound flocs, and said minimal formation of nickel and zinc hydroxyl compound flocs from said acidic wastewater, wherein said first settler separates and removes said first formation of flocculate hydroxyl matters, said significant formation of copper hydroxyl compound flocs and said minimal formation of nickel and zinc hydroxyl compound flocs from said acidic wastewater;

(p) transferring said acidic wastewater from said first settler to a third conditioning tank which is connected to said chemical storage tank to receive said sodium hydroxide;

(q) mixing said sodium hydroxide with said acidic wastewater in said third conditioning tank to increase said pH level of said acidic wastewater to a range of approximately 7.5–9 resulting in a significant formation of residual heavy metal flocs within said acidic wastewater;

(r) transferring said acidic water from said third conditioning tank to a third serpentine pipe structure;

(s) adding said cationic polymer to said acidic wastewater and an anionic polymer to said acidic wastewater in said third serpentine pipe structure resulting in a second formation of flocculate hydroxyl matters within said acidic wastewater;

(t) transferring said acidic wastewater from said third serpentine pipe structure to a second settler; and (u) separating and removing said second formation of flocculate hydroxyl matters and said significant formation of residual heavy metal flocs from said acidic wastewater, wherein said second settler separates and removes said second formation of flocculate hydroxyl matters and said significant formation of residual heavy metals from said acidic wastewater resulting in substantially clean water exiting said second settler.

11. The method of claim 10 wherein each of said first, second and third conditioning tanks has a mixer to mix said acidic wastewater with said sodium hydroxide to raise the pH level of said acidic wastewater exiting from said first conditioning tank, said second conditioning tank and said third conditioning tank, wherein an optimal pH level of said acidic wastewater in said first conditioning tank is 3, the optimal pH level of said acidic wastewater in said second conditioning tank is 6 and the optimal pH level of said acidic wastewater in said second conditioning tank is 8.5.

12. The method of claim 10 wherein the heavy metals removed by said method from said acidic wastewater include copper, nickel, zinc and lead.

13. The method of claim 10 further comprising the steps of:

(a) providing a first liquid transfer pump connected to said first conditioning tank and said first serpentine pipe structure for transferring said acidic wastewater from said first conditioning tank through said first serpentine pipe structure to said flotation tank;

(b) providing a second liquid transfer pump connected to said second conditioning tank and said second serpentine pipe structure for transferring said acidic wastewater from said second conditioning tank through said second serpentine pipe structure to said first settler; and (c) providing a third liquid transfer pump connected to said third conditioning tank and said second settler for transferring said acidic wastewater from said third conditioning tank through said third serpentine pipe structure to said second settler.

14. The method of claim 13 further comprising the steps of:

(a) providing a fourth liquid transfer pump for transferring said acidic wastewater from said flotation tank to a second conditioning tank; and (b) providing a fifth liquid transfer pump for transferring said acidic wastewater from said first settler to a third conditioning tank.

15. The method of claim 10 further comprising the steps of:

(a) providing a first polymer transfer pump connected to said first serpentine pipe structure for transferring said cationic polymer from a source for said cationic polymer to said first serpentine pipe structure;

(b) providing a second polymer transfer pump connected to said second serpentine pipe and said third serpentine pipe structure for transferring said cationic polymer from said source for said cationic polymer to said second serpentine pipe structure and said third serpentine pipe structure; and (c) providing a third polymer transfer pump connected to said third serpentine pipe structure for transferring said anionic polymer from a source for said anionic polymer to said third serpentine pipe structure.

16. The method of claim 10 further comprising the steps of:

(a) providing a first chemical transfer pump connected to said first conditioning tank for transferring said sodium hydroxide from a chemical storage tank to said first conditioning tank;

(b) providing a second chemical transfer pump connected to said second conditioning tank for transferring said sodium hydroxide from said chemical storage tank to said second conditioning tank; and (c) providing a third chemical transfer pump connected to said third conditioning tank for transferring said sodium hydroxide from said chemical storage tank to said third conditioning tank.

17. The method of claim 10 wherein wherein said method reduces a concentration of copper from about 1800 mg/l to about 0.5 mg/l; a concentration of nickel from about 670 mg/l to about 2.1 mg/l; a concentration of zinc from about to about 79 mg/l to zero mg/l; and a concentration of lead from about 7.4 mg/l to about zero mg/l.

18. The method of claim 10 further comprising the steps of:

(a) providing a first diaphragm pump having an inlet port connected to said floatation tank and an outlet port;

(b) providing a second diaphragm pump having an inlet port connected to said first settler and an outlet port;

(c) providing a third diaphragm pump having an inlet port connected to said second settler and an outlet port; and (d) providing a sludge discharge pipe connected to the outlet ports of said first, second and third diaphragm pumps.

19. The method of claim 18 wherein said first, second and third diaphragm pumps remove said sludge, said formation of flocculate organic matters, and first and second formations of flocculate hydrxyl matters from said floatation tank, said first settler and said second settler.

20. The method of claim 10 further comprising the step of providing a wastewater transfer pump connected to said first conditioning tank to supply said wastewater to said first serpentine pipe structure.

* * * * *